United States Patent
Barbu et al.

(10) Patent No.: US 7,909,575 B2
(45) Date of Patent: Mar. 22, 2011

(54) POWER LOSS REDUCTION IN TURBULENT WIND FOR A WIND TURBINE USING LOCALIZED SENSING AND CONTROL

(75) Inventors: Corneliu Barbu, Saratoga Springs, NY (US); Anurag Gupta, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 939 days.

(21) Appl. No.: 11/823,017

(22) Filed: Jun. 25, 2007

(65) Prior Publication Data

US 2008/0317598 A1 Dec. 25, 2008

(51) Int. Cl.
*F03D 7/04* (2006.01)

(52) U.S. Cl. .......... 416/61; 416/1; 416/41; 416/42; 416/146 R; 416/231 R

(58) Field of Classification Search ........... 416/1, 31, 416/37, 41, 42, 61, 90 R, 92, 90 A, 23, 24, 416/36, 146 R, 231 R; 415/914
See application file for complete search history.

(56) References Cited

U.S. PATENT DOCUMENTS

| | | | | |
|---|---|---|---|---|
| 4,504,192 A | * | 3/1985 | Cyrus et al. | 416/41 |
| 7,354,247 B2 | * | 4/2008 | Bonnet | 416/90 R |
| 7,387,491 B2 | * | 6/2008 | Saddoughi et al. | 416/62 |
| 7,445,431 B2 | * | 11/2008 | Larsen et al. | 416/1 |
| 7,632,068 B2 | * | 12/2009 | Bak et al. | 416/23 |
| 2006/0140764 A1 | | 6/2006 | Smith et al. | 416/103 |
| 2007/0231151 A1 | * | 10/2007 | Herr et al. | 416/229 A |
| 2008/0298963 A1 | | 12/2008 | Egedal | |

FOREIGN PATENT DOCUMENTS

| WO | WO 2004074681 A1 | * | 9/2004 |
| WO | WO 2005071382 A1 | * | 8/2005 |

* cited by examiner

*Primary Examiner* — Ninh H Nguyen
*Assistant Examiner* — Jesse Prager
(74) *Attorney, Agent, or Firm* — Ann M. Agosti

(57) ABSTRACT

A wind turbine blade assembly includes at least one local load sensor disposed on and/or within a surface of the wind turbine blade and at least one active flow modification device disposed on and/or within a surface of the wind turbine blade and configured to alter the aerodynamics of the wind turbine blade in response to real time local load sensor measurements such that a difference between a current angle of attack and an optimum angle of attack on the wind turbine blade is substantially minimized.

28 Claims, 4 Drawing Sheets

POWER LOSS REDUCTION IN TURBULENT WIND FOR A WIND TURBINE USING LOCALIZED SENSING AND CONTROL

BACKGROUND

This invention relates generally to the field of wind turbines, and more specifically to localized sensing and actuation systems to reduce the effect of angle of attack deviation (from the planned/controlled value) on power and loads in turbulent winds.

Wind turbines are increasingly gaining importance in the area of renewable sources of energy generation. In recent times, wind turbine technology has been applied to large-scale power generation applications. Maximizing wind turbine performance while minimizing system loads in given wind conditions is one of the many challenges that exist in harnessing wind energy. Non-limiting examples of improved wind turbine performance parameters, which lead to minimized cost of energy, include maximized aerodynamic efficiency, maximized energy output, minimized wind turbine system loads, minimized noise, and combinations thereof. Examples of wind turbine system loads include extreme loads (operational and parked/idling) and fatigue loads.

Reducing the difference between entitlement and actual power capture is one of the main objectives of the control problem for variable speed wind turbines. Strongly coupled with this problem is the reduction of structural loads on the turbine components. Modern wind turbines include very long blades; and this large area of the rotor experiences large wind variations, both in turbulence intensity, as well as shear. Wind turbine blades are generally designed for constant tip speeds, without taking into consideration the nonlinear variations of wind due to turbulence and shear. Employing local actuators that can vary the blade aerodynamics via flow control, to reduce the impact of the wind variation along the blade, also reduces the power loss and loading on the blade. Wind induced loading on the rotor is also reduced at the same time.

In view of the foregoing, it would be beneficial and advantageous to provide a technique for detecting local instantaneous blade loading that can be used to provide information about the actual angle of attack such that localized actuation can be applied to alter the aerodynamics of the blade(s) to compensate for existent angle of attack mismatch in order to reduce its effect on the power capture and load imbalance seen by the turbine components (rotor, drive train, tower).

BRIEF DESCRIPTION

Embodiments of the present invention are directed to localized sensing and actuation systems to reduce the effect of angle of attack deviation (from the planned/controlled value) on power and loads in turbulent winds. One embodiment is directed to a wind turbine comprising: a wind turbine blade disposed on the wind turbine, the blade being configured to rotate about an axis upon an impact of a wind flow on the blade; at least one load sensor disposed on or within the blade, the at least one load sensor configured to measure local loading on the blade due to local wind inflow sensed at the at least one load sensor; and at least one active flow modification device disposed on the blade, the at least one active flow modification device configured to modify the wind flow proximate to the blade, and wherein the at least one active flow modification device is configured to receive active flow modification instructions based on the at least one sensor local loading measurements.

Another embodiment of the present invention is directed to a method of operating a wind turbine comprising a blade rotatable about an axis upon an impact of a wind flow on the blade, the method comprising: measuring local loading on the blade via at least one load sensor disposed on or within the blade due to local wind inflow sensed at the at least one load sensor; obtaining a current angle of attack on the blade based on the local loading; determining an optimum angle of attack on the blade; and actively modifying the wind flow proximate to the blade to alter the aerodynamics of the blade and compensate for the difference between the current angle of attack and the optimum angle of attack on the blade.

Yet another embodiment of the present invention is directed to a wind turbine blade assembly comprising at least one local load sensor disposed on or within a surface of the wind turbine blade and at least one active flow modification device disposed on or within a surface of the wind turbine blade and configured to alter the aerodynamics of the wind turbine blade in response to local load sensor measurements such that a difference between a current angle of attack and an optimum angle of attack is substantially minimized.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
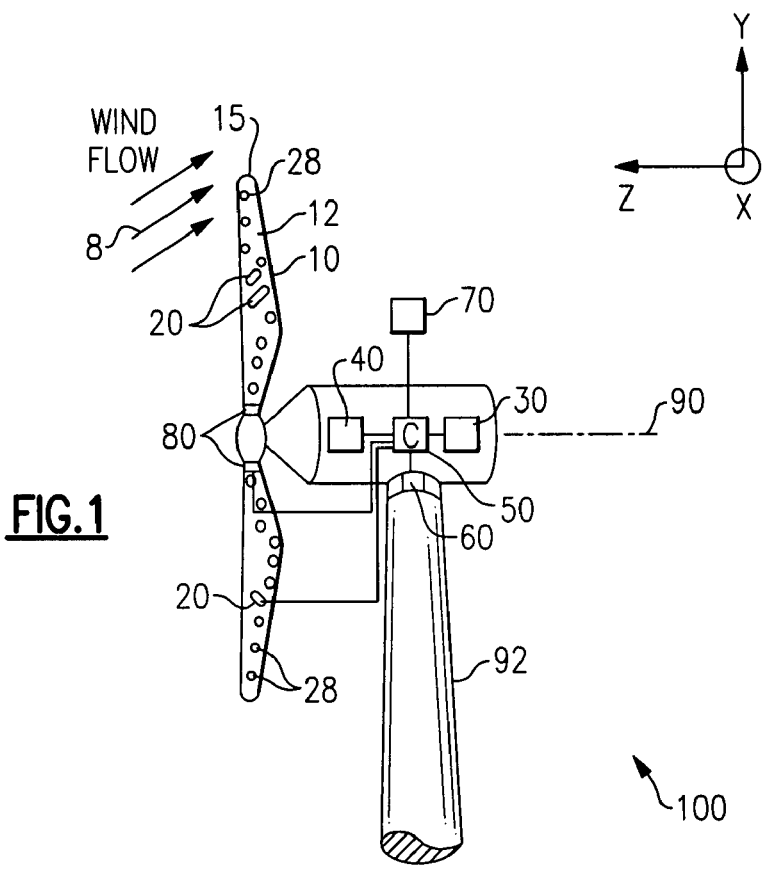
FIG. 1 is an exemplary configuration of a wind turbine according to one embodiment.

FIG. 1 illustrates a wind turbine 100 in accordance with one embodiment of the present invention. The wind turbine 100 includes a wind turbine blade 10 configured to rotate about an axis 90 upon impact of an incident wind flow, for example, a wind flow 8 as shown. It is appreciated that as used herein, the terms "a", "an" and "the" refer to "at least one" and plural variants thereof, unless otherwise specifically mentioned or indicated by the context. The axis of rotation 90 is along the z-axis in the axes system of FIG. 1, and the plane of rotation of the blades 10 is x-y plane, the x-axis coming out of the plane of the paper. An active flow modification device 20 and a load sensor such as a fiber optic sensor 28 are further disposed on the blade 10; and the blade, active flow modification device 20 and fiber optic sensor 28 together form a wind turbine blade assembly 17 (shown in FIG. 2).

Other types of load sensors can also be employed, such as, but not limited to, unsteady pressure sensors, angle of attack sensors, accelerometer, strain gauges, fiber Bragg gratings, and the like, so long as the load sensors are configured to measure local loading at desired points on the wind turbine blades 10. These load sensors can be positioned on the surface of the blades 10, embedded within the surface of the blades 10, or can be both positioned on and embedded with the surface of the blades 10.

The active flow modification device 20 is configured to modify the wind flow 8 proximate to the blade in response to measured data provided by the local load sensors 28, thereby altering the aerodynamics of the blade to compensate for the angle of attack mismatch, reducing its effect on the power capture and loads imbalance seen by the wind turbine 100 components (rotor, drive train, tower, etc.). The term "wind flow proximate to the blade" will be understood as referring to that portion of the wind flow that is proximate to the blades (including blade surface and tip) and not the entire wind flow 8. The wind flow proximate to the blade 10 includes, without limitation, wind flow zones over the blade surface and tip-vortices near a tip end of the blade 10.

Figure 2:
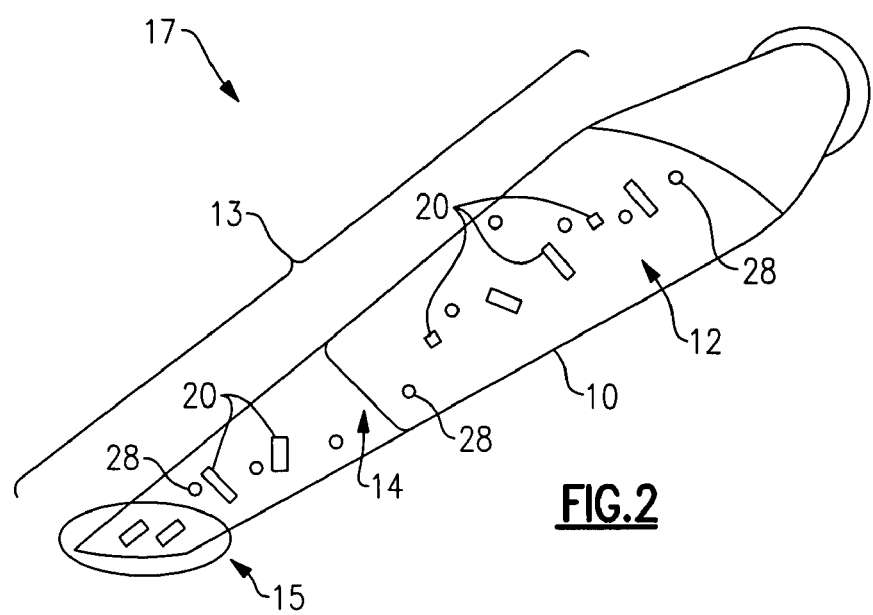
FIG. 2 illustrates a wind turbine blade assembly comprising wind turbine blade, a plurality of fiber optic sensors and a plurality of active flow modification devices disposed in various orientations on the blade shown in FIG. 1.

FIG. 2 illustrates the wind turbine blade assembly 17 comprising the wind turbine blade 10, a number of local load sensors such as fiber optic sensors 28 and a number of the active flow modification devices 20 disposed in various orientations on or within the blade 10. The blade 10 includes a side 12 and a tip 15, and the active flow modification devices 20 disposable on or within the blade are optionally disposed at different angles on the side 12 (meaning on at least one side) and the tip 15; while the local load (e.g. fiber optic) sensors 28 disposable on or embedded within the blade are optionally disposed at different locations on the side 12 and the tip 15. The side 12 has a length 13 and a breadth 14 that may vary along the length, and the tip 15 includes the end portion of the blade 10. The local load/fiber optic sensors 28 and active flow modification devices 20 may also be disposed on a second side (not shown in the figure) opposite to the side 12.

The active flow modification devices 20 are typically configured to release, in a time-dependent fashion, jets of desired strengths and at desired frequencies. Non-limiting examples of such devices 20 include piezoelectric synthetic jets or zero-mass actuators, as well as other types of synthetic jet devices. Synthetic jet devices are particularly beneficial because such devices have low power requirements, low weight penalties, large control authority (jet strength), good frequency and amplitude range, and compactness, and therefore permit ease of integration with the wind turbine blade system. In other embodiments, the active flow modification device 20 system may be configured to modify the wind flow using methods other than the synthetic jets. For example, other non-zero mass flow actuation devices, such as flip-flop jets and fluidic oscillators that provide pulsed velocity jets, can alternatively or additionally be used. Further, synthetic jets in certain embodiments may be configured to provide steady blowing exclusively or in addition to pulsed actuation in order to alter the aerodynamics of wind turbine blades.

With continued reference to FIG. 1, the wind turbine 100 also includes a wind turbine generator 30 that converts mechanical energy to electrical energy, a gear mechanism 40 that provides the mechanical energy harnessed from the wind turbine blades to the generator 30. A controller 50 is operably coupled to the local load sensors (e.g. fiber optic sensors) 28, for obtaining a current state of an operating condition of the wind turbine, and to the active flow devices 20 for providing active flow control to the wind turbine while in operation. The controller 50 may further be coupled to the generator 30, the gear mechanism 40, a yaw mechanism 60, and a blade pitch mechanism 80 for controlling aspects of the wind turbine operation or for receiving inputs. It is noted that coupling between the controller 50, the local load/fiber optic sensors 28 and the active flow modification devices 20 has been shown in FIG. 1 by the use of connecting lines for illustrative purposes only, and do not necessarily indicate wires, but rather include any suitable means for operably coupling the devices.

In one embodiment, the active flow modification devices 20 provide for active flow modification in the wind flow around the blade by controlling flow separation proximate to the blade and thereby modifying the loading of the wind turbine blades. According to one technique, the active flow modification is configured to promote a flow separation in the wind flow proximate to the blade, thereby deteriorating lift available to the wind turbine. This technique is employed in response to gusty winds and reduces system loads. According to another technique, the active flow modification prevents the flow separation in the wind flow proximate to the blade, by adding unsteady aerodynamic momentum and vorticity to the wind flow proximate to the blade. This leads to enhancement of the lift available to the wind turbine, and therefore generation of more power for a given blade size or same power with a reduced blade size (that is, having lower chord lengths, reduced thicknesses, or combinations thereof).

Figure 3:
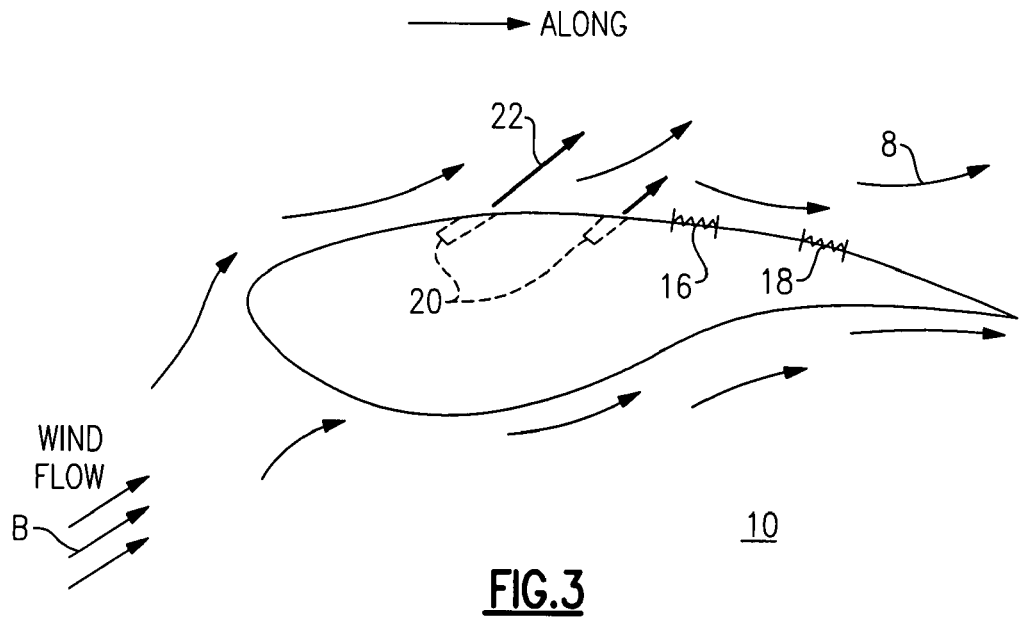
FIG. 3 is a partial cut-away view of the wind turbine blade shown in FIG. 2 showing the active flow modification devices configured for controlling flow separation to increase lift by modifying the wind flow proximate to the blade.
Figure 4:
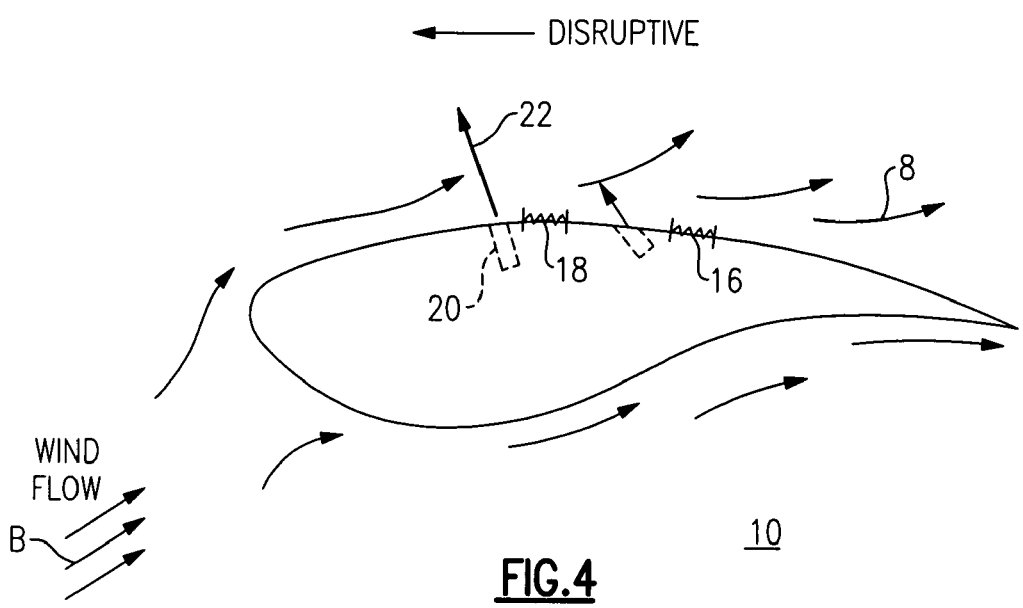
FIG. 4 is a partial cut-away view of the wind turbine blade shown in FIG. 2 showing the active flow modification devices configured for controlling flow separation to inhibit lift by modifying the wind flow proximate to the blade.

More specifically, as illustrated by FIGS. 3-4, in several embodiments the active flow modification device 20 is disposed on the side 12 of the blade 10. The active flow modification devices are configured for controlling flow separation by modifying the wind flow proximate to the blade 10 in response to localized blade loading information provided by the local load sensors 28.

For example, in the embodiment of FIG. 3, flow separation is inhibited (meaning diminished, delayed, or combinations thereof) by the active flow modification devices. For example purposes in FIG. 3, the flow separation point is represented as being at a position 18 as opposed to at an upstream position 16 where it would naturally result without active flow modification. In one embodiment, the flow separation is inhibited by introducing a steady and/or an unsteady (time dependent) jet flow 22 having a large component of momentum and vorticity substantially along the wind flow proximate to the blade, as also illustrated by the embodiment of FIG. 3. The jet flow 22 in FIG. 3 adds momentum and vorticity in the wind flow proximate to the blade. When vorticity and momentum are added by the active flow modification, the momentum deficit of boundary layers is at least partially replenished, and the flow separation is inhibited and available lift is enhanced. The flow in which separation has been inhibited, as exhibited in FIG. 3, helps in adding lift thereby increasing the performance of the turbine for a given blade size or reducing the blade chord lengths for a given level of performance. The active flow modification devices may add momentum and vorticity at specific angles to an incident wind flow, and such angles may be varied according to the desired performance conditions.

In another example illustrated by FIG. 4, flow separation is promoted by the active flow modification devices in response to local load information provided by the local load sensors 28. For example purposes in FIG. 4, the flow separation point is represented as being at a position 18 as opposed to at a down stream position 16 where it would naturally result without active flow modification. In the embodiment of FIG. 4, the flow separation is promoted by introducing a steady and/or an unsteady jet flow 22 having a large component of momentum substantially disruptive to the wind flow proximate to the blade. The jet flow 22 of FIG. 4 initiates flow separation in the wind flow proximate to the blade. The disruptive jet flow 22 may be an oblique jet flow that obstructs the natural wind flow proximate to the blade. The promoted flow separation as exhibited in FIG. 4 results in a decreased lift, and may be advantageously employed to mitigate undesirable loading conditions. Such undesirable conditions include cases of increase in wind flow velocity that leads to an increased loading of the blades (increased lift) and the wind turbine. The embodiments as discussed advantageously provide for artificially decreasing the lift, nearly instantaneously in certain cases, by actively modifying the wind flow proximate to the blade as exhibited in FIG. 4. As discussed, the active flow modification devices may add disruptive momentum at specific angles to an incident wind flow, and such angles may be varied according to the desired performance conditions.

According to another aspect of the invention, active flow modification is advantageously applied to reduce the effect of angle of attack deviation (from the planned/controlled value) on power and loads in turbulent winds, for reducing wind turbine losses (and thus increasing aerodynamic efficiency), for reducing the aerodynamic noise generated proximate to the tip 15 of the blade, or for combinations of loss and noise reduction. In an embodiment illustrated by FIG. 5, an active flow modification device 20 is disposed on the tip 15 of the blade 10. According to one aspect of the technique, the active flow modification device 20 is configured for modifying a tip vortex 24 by modifying the wind flow proximate to the blade 10. In the embodiment illustrated by FIG. 5, the tip vortex 24 is modified by introducing a steady and/or an unsteady jet flow 23 that causes the tip vortex 24 (dashed line) to be displaced to another location as illustrated by tip vortex 26. In other cases the added jet flow may be used to affect the initiation and development of the tip vortices or modify the evolution and trajectory of the tip vortex 24. In general, the jets 23 modify the flow structure near the tip, and result in a quick dissipation of the vortex, or a displacement of the tip vortex 24 away from the tip, or a reduction in the strength of the tip-vortex being formed.

Another significant aspect of the invention is that these local load sensors 28 and/or active flow modification devices 20 may be disposed in either retrofit of existing blade embodiments or be used to come up with new blade embodiments. For new blade embodiments, the capability to control the separation and hence the loading levels of the blade imply that newer and more radical, or at least a larger variety of airfoil and blade shapes, beyond those that comprise the state-of-the art in wind turbine airfoil/blade design may now be used in wind turbine blades. Such new designs may be optimized to provide higher aerodynamic performance (lift and lift-to-drag ratios, for examples) and efficiency than those presently used.

The strategies, as discussed, are among the ones that the controller 50 may employ for actively modifying the wind flow 8 and corresponding aerodynamics of the blade in response to measured load information provided by the local load sensors 28. The controller 50 is configured to receive the localized instantaneous blade loading which, correlated with the aerodynamic maps and rotor average wind speed, and/or other desired information, provides information about the actual angle of attack, and in response to the current state of the operating conditions, actively modify the wind flow 8 proximate to the blade. The operating conditions include, without limitation, wind environmental conditions, for example, wind flow velocity and wind flow direction. In certain embodiments, operating conditions further include turbine rotation speed, pitch angle of the blades, and yaw angle of the wind turbine.

In one embodiment, the controller 50 is configured to provide active flow instructions to at least one active flow modification device 20 in response to the current state of at least one operating condition. In an aspect, upon the occurrence of a sudden increase of incident wind velocity or a change in wind direction that significantly increases the lift to undesirable levels, the controller 50 activates the active flow modification devices 20 configured to release disruptive steady and/or unsteady jet flows, as shown in FIG. 4. In another aspect, the controller maintains the active flow modification devices in an activated state and turns them off upon detecting a change in incident wind velocity or direction that might increase system loads to undesirable levels.

Figure 5:
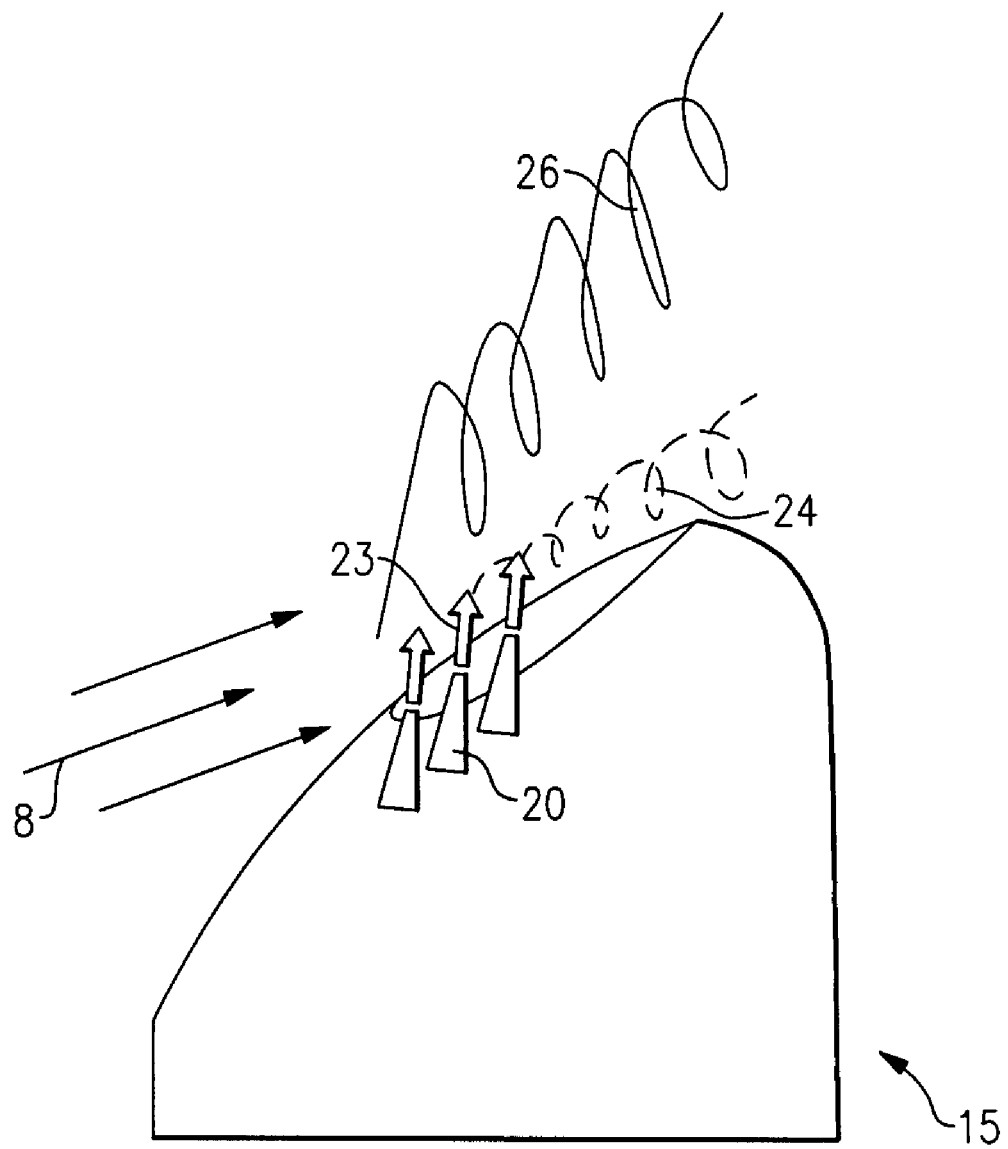
FIG. 5 is a partial cut-away view of the wind turbine blade shown in FIG. 2 showing an active flow modification device disposed on the tip of the blade in which the active flow modification device is configured for modifying a tip vortex by modifying the wind flow proximate to the blade.

According to another aspect, conditions in which the lift available may be low due to low wind flow speeds or unfavorable wind flow direction, and consequently the power generated is low, the controller 50 activates the active flow modification devices configured to release a steady and/or an unsteady jet flow that enhances the lift by inhibiting flow separation, as illustrated in FIG. 3. According to another aspect, the controller 50 activates the active flow modification devices proximate to the tip of the blade, dissipating the tip vortex or displacing the tip vortex away from the tip, as illustrated by FIG. 5.

Appropriate response strategies, by using active flow instructions, in response to measured local blade loading conditions will be apparent to those skilled in the art, and such apparent strategies are embodied in the scope and spirit of the present invention. For example, within the embodiment wherein the active flow modification devices comprise synthetic jets, various response strategies include without limitation, modifying a velocity of the synthetic jets 22 or 23, modifying a frequency of introducing the synthetic jets 22 or 23, a location of the synthetic jet 22 on the side 12, a location of the synthetic jet 23 on the tip 15, an angle of the synthetic jets 22 or 23 (meaning either the entire jet, holes of the jet, or combinations thereof), a size of the synthetic jet exits (holes or slots), a shape of the synthetic jet exits (holes or slots), and combinations thereof. The various response strategies may be realized by, for example, disposing multiple active flow modification devices 20, of different exit sizes and shapes, in differing orientations or locations, and selectively activating the active flow modification devices in response to information generated via the local load sensors 38.

In one embodiment, the controller 50 is further configured to receive a current state of the gear and generator functions, and is configured to also provide active flow instructions in response to these conditions.

Figure 6:
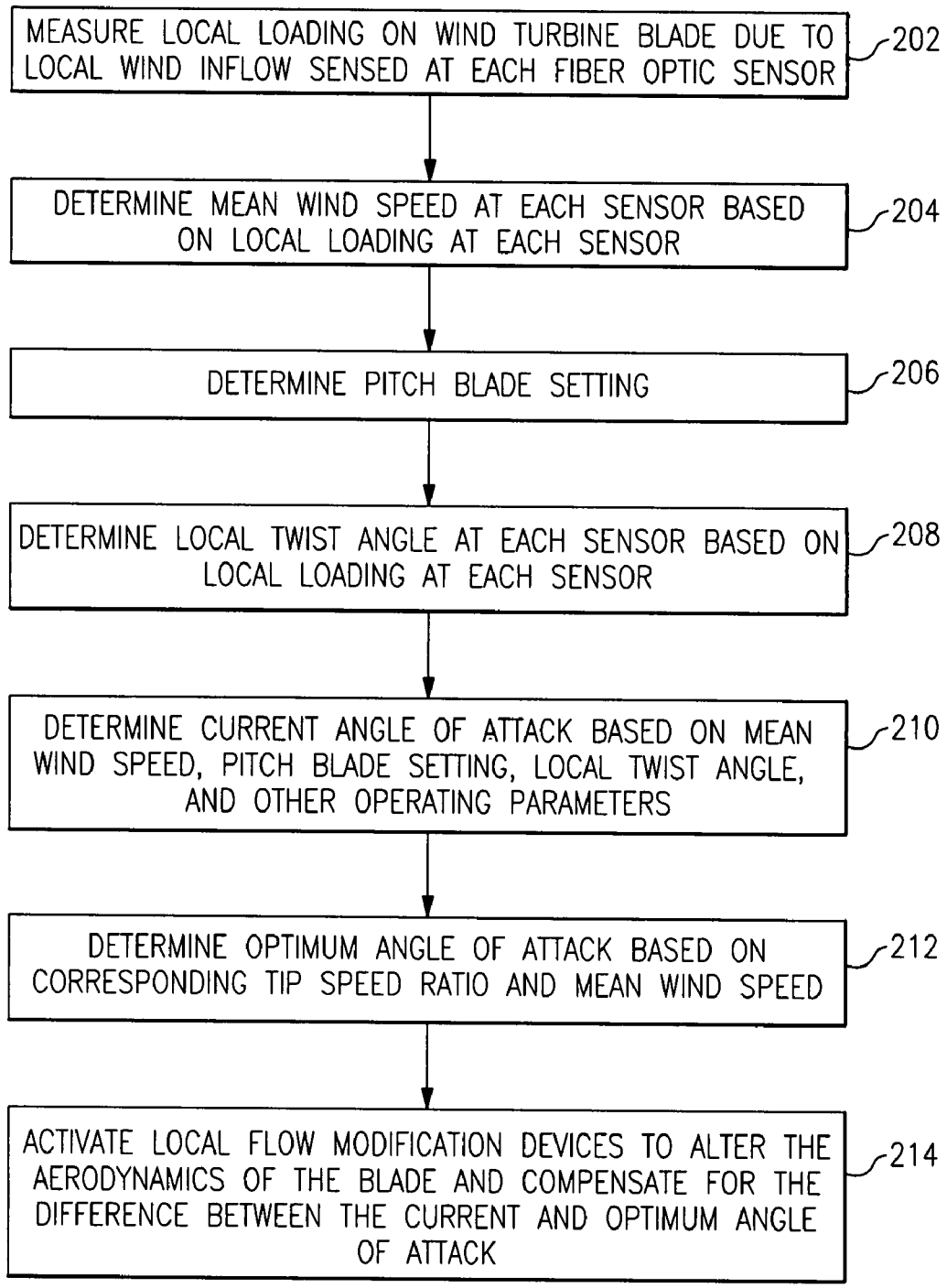
FIG. 6 shows a method of reducing power loss reduction in turbulent wind for a wind turbine shown in FIG. 1 using localized sensing via a plurality of fiber optic sensors disposed on the wind turbine blades and control via a plurality of active flow modification devices, also disposed on the wind turbine blades.

Moving now to FIG. 6, a method 200 of reducing power loss reduction in turbulent wind for a wind turbine 100 using localized sensing via a plurality of local load sensors such as, but not limited to, fiber optic sensors 28 disposed on and/or embedded within the surface of the wind turbine blades 10, and control via a plurality of active flow modification devices 20, also disposed on and/or within the wind turbine blades 10. The local load/fiber optic sensors 28, in one embodiment, detect the local instantaneous blade 10 loading which, when correlated with the aerodynamic maps and rotor average wind speed, provides information about the actual angle of attack, as stated herein before. Localized actuation to alter the aerodynamics of the blade 10 operate to compensate for the angle of attack mismatch from a nominal value, due to turbulent wind fluctuations or wind shear or upstream wakes and gusts along the blade 10, reducing its effect on the power capture and loads imbalance seen by the turbine 100 components. This mismatch, and hence unexpected loading is then mitigated by using localized actuation that alters the blade loading using flow control techniques such as described herein before with reference to FIGS. 1-5. This control authority can be used in addition or in combination with conventional pitch control systems that individually pitch each blade as a function of the wind loading.

One feature of the embodiments described herein before for reducing power loss in turbulent wind is directed to use of optical fiber and load sensors installed along the fiber which is installed in or on the blade 10. The use of such fiberoptic sensors 28 provide for 1) large-scale distribution sensing, 2) immunity to EMI, 3) passive multi-parameter sensing, 4) resistance to corrosion, 5) resistance to radiation, 6) enhanced operational temperature capabilities, 7) enhanced high-pressure operating characteristics, and 8) a broad bandwidth, among other things. Fiberoptic sensors therefore provide advantages not available with electrical-based sensors that are generally difficult to be distributed, difficult to operate in harsh environments, not easily embedded in structures, and susceptible to EMI. The foregoing advantages provided by fiberoptic sensors contribute to reduced maintenance costs, enhanced productivity, improved reliability and increased performance.

Another feature of the embodiments described herein before for reducing power loss in turbulent wind is directed to use of distributed actuation methods, such as active flow control, to change the aerodynamic properties of the blade 10, as a function of instantaneous operating conditions provided via a plurality of fiber optic sensors 28 disposed on or within the blade 10.

Yet another feature of the embodiments described herein before for reducing power loss in turbulent wind is directed to use of a dynamic controller that is responsive to local wind load information provided by a plurality of fiber optic sensors to take advantage of the local actuation capabilities to 1) satisfy certain performance objectives, in which these objectives may vary locally along the blade 10 and may change between circulation control and separation control, or 2) compensate for any angle of attack variation, or 3) reduce local imbalance of the blade loads.

With continued reference now to FIG. 6, the method 200 advantageously considers that wind flow is never constant across the wind turbine rotor causing variations in the local angle of attack which the blade design cannot take into account, through twist distribution or through blade pitching. The method 200, in one embodiment, accounts for power capture and loading on the blade 10 due to these angle of attack variations.

The method 200 of reducing power loss reduction in turbulent wind for a wind turbine 100 using localized sensing via a plurality of fiber optic sensors 28 disposed on and/or within the wind turbine blade(s) 10 and control via a plurality of active flow modification devices 20, also disposed on and/or within the wind turbine blades 10, commences by measuring local loading on the wind turbine blade(s) 10 due to local wind inflow sensed at each load/fiber optic sensor 28, as represented in step 202. The mean wind speed at each load sensor 28 is then determined based on the local loading at each load/fiber optic sensor 28, as represented in step 204. The blade pitch is also determined from the blade setting, as represented in step 206. The local twist angle at each load/fiber optic sensor 28 is then determined based on the local loading at each load sensor 28, as represented in step 208. Upon determination of the pitch blade setting(s) as well as the mean wind speed and the local twist angle at each load sensor 28, the current angle of attack based on this data is then determined, as represented in step 210. Subsequently, the optimum angle of attack based on corresponding tip speed ratio and mean wind speed is determined, as represented in step 212. When the current angle of attack and optimum angle of attack have been determined, the difference between the current angle of attack and optimum angle of attack are then compensated for by activating one or more of the local flow modification devices 20 to compensate for this difference, as represented in step 214.

When the difference between the current and optimum angles of attack have been compensated for, the aerodynamics of the blade(s) 10 will have then been altered to reduce the angle of attack effect on the power capture and loads imbalance seen by the wind turbine components (rotor, drive train, tower, etc.).

In summary explanation, localized sensing, actuation and control is employed to increase power capture by locally compensating for the angle of attack mismatch between local current angle of attack and local optimum angle of attack. The embodiments described herein before account for non-constant wind flow across a wind turbine rotor, and hence, variations in the local angle of attack which the blade design cannot take into account, through twist distribution or through blade pitching, thus improving power capture and reducing loading on the blade(s) 10. The current angle of attack is determined using measurements of local loading on the blade(s) 10 due to local wind inflow using a plurality of local wind load sensors, such as, for example, fiber optic sensors, and taking into account the mean wind speed, pitch blade setting and local twist angle.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A wind turbine comprising:
a wind turbine blade disposed on the wind turbine, the blade being configured to rotate about an axis upon an impact of a wind flow on the blade;
at least one load sensor disposed within the surface of the blade, the at least one load sensor configured to measure local loading on the blade due to local wind inflow sensed at the at least one load sensor; and
at least one active flow modification device disposed on the blade, the at least one active flow modification device configured to modify the wind flow proximate to the blade in response to a local twist angle determined at each load sensor location, and
wherein the at least one active flow modification device is configured to receive active flow modification instructions based on the at least one sensor local loading measurements, and further wherein the at least one load sensor and the wind turbine blade are constructed of the same reinforcing fiber material.

2. The wind turbine of claim 1, wherein the at least one load sensor is selected from a fiber optic sensor, an unsteady pressure sensor, an angle of attack sensor, an accelerometer, a strain gauge, and a fiber Bragg grating.

3. The wind turbine of claim 1, further comprising a controller configured to generate the active flow modification instructions to the at least one active flow modification device in response to local loading measurement information provided by the at least one load sensor, such that the at least one active flow modification device alters the aerodynamics of the blade to reduce a difference between a current angle of attack measurement and an optimum angle of attack for the blade.

4. The wind turbine of claim 1, wherein the at least one active flow modification device is selected from a piezoelectric device and a synthetic jet device.

5. The wind turbine of claim 1, wherein the at least one active flow modification device is configured for modifying a load on the wind turbine in response to local loading measurement information provided by the at least one load sensor, by reducing the load on the wind turbine.

6. The wind turbine of claim 1, wherein the at least one active flow modification device is disposed on or within the side, and wherein the at least one active flow modification device is configured for modifying flow separation in response to local loading measurement information provided by the at least one load sensor.

7. The wind turbine of claim 6, wherein the at least one active flow modification device is configured for inhibiting flow separation in response to local loading measurement information provided by the at least one load sensor, by introducing a steady or an unsteady jet flow with a large component of momentum and vorticity substantially along the wind flow proximate to the blade.

8. The wind turbine of claim 6, wherein the at least one active flow modification device is configured for promoting flow separation in response to local loading measurement information provided by the at least one load sensor, by introducing a steady or an unsteady jet flow with a large component of momentum substantially disruptive to the wind flow proximate to the blade.

9. The wind turbine of claim 1, wherein the at least one active flow modification device is disposed on or within a tip, the active flow modification device being configured for modifying a tip vortex.

10. The wind turbine of claim 9, wherein the at least one active flow modification device is configured for modifying the tip vortex in response to local loading measurement information provided by the at least one load sensor, by weakening, destroying, displacing, or combinations thereof.

11. The wind turbine of claim 9, wherein the at least one active flow modification device is configured to introduce a steady or an unsteady jet flow in the wind flow proximate to the tip in response to local loading measurement information provided by the at least one load sensor.

12. The wind turbine of claim 1, wherein the at least one active flow modification device introduces a steady or an unsteady jet flow in the wind flow proximate to the blade in response to local loading measurement information provided by the at least one load sensor, and further comprising a controller configured for providing the active flow modification instructions to the at least one active flow modification device in response to the local loading measurement information provided by the at least one load sensor, to modify a characteristic of the introduced jet flow, wherein the at least one active flow modification device comprises a synthetic jet, and wherein the characteristic is selected from the group consisting of a velocity of the synthetic jet, a frequency of the synthetic jet, a location of the synthetic jet on the side, an angle of the synthetic jet, a size of the synthetic jet exit, a shape of the synthetic jet exit, and combinations thereof.

13. A method of operating a wind turbine comprising a blade rotatable about an axis upon an impact of a wind flow on the blade, the method comprising:
providing at least one load sensor disposed within the surface of the blade, wherein the at least one load sensor and the wind turbine blade are constructed of the same reinforcing fiber material;
measuring local loading on the blade via the at least one load sensor disposed on or within the blade due to local wind inflow sensed at the at least one load sensor;
determining mean wind speed at the at least one load sensor based on the local loading at the at least one load sensor;
determining local twist angle at the at least one load sensor based on the local loading at the at least one load sensor;
obtaining the blade pitch setting;
determining the current angle of attack based on the mean wind speed, pitch setting and local twist angle;
determining an optimum angle of attack on the blade; and
actively modifying the wind flow proximate to the blade to alter the aerodynamics of the blade and compensate for the difference between the current angle of attack and the optimum angle of attack on the blade.

14. The method of claim 13, wherein the at least one load sensor is selected from a fiber optic sensor, a steady pressure sensor, an unsteady pressure sensor, an angle of attack sensor, an accelerometer, a strain gauge, and a fiber Bragg grating.

15. The method of claim 13, wherein determining an optimum angle of attack for the blade comprises:
determining a corresponding tip speed ratio; and
determining the optimum angle of attack based on the corresponding tip speed ratio and the mean wind speed.

16. The method of claim 13, wherein actively modifying comprises using a synthetic jet device.

17. The method of claim 13, wherein said actively modifying the wind flow is performed in a manner to reduce a load on the wind turbine.

18. The method of claim 13, wherein said actively modifying the wind flow comprises modifying a flow separation in the wind flow proximate to the blade.

19. The method of claim 13, wherein said actively modifying the wind flow comprises inhibiting a flow separation in the wind flow proximate to the blade by introducing a steady or an unsteady jet flow having a large component of momentum and vorticity substantially along the wind flow proximate to the blade.

20. The method of claim 19, wherein said inhibiting the flow separation occurs in response to a lower than desired level of wind lift to the wind turbine.

21. The method of claim 13, wherein said actively modifying the wind flow comprises initiating a flow separation in the wind flow proximate to the blade by introducing a steady or an unsteady jet flow having a large component of momentum substantially disruptive to the wind flow proximate to the blade.

22. The method of claim 21, wherein said initiating a flow separation occurs in response to a higher than desired level of wind lift generated by the wind flow.

23. The method of claim 13, wherein said actively modifying comprises attenuating an aerodynamic noise generated proximate to a tip of the blade by introducing a jet flow proximate to the tip.

24. The method of claim 23, wherein said introducing the jet flow modifies a tip vortex.

25. A wind turbine blade assembly comprising at least one local load sensor disposed within a surface of a wind turbine blade and at least one active flow modification device disposed on or within a surface of the wind turbine blade and configured to alter the aerodynamics of the wind turbine blade in response to a local twist angle determined at each load sensor location based on local load sensor measurements such that a difference between a current angle of attack and an optimum angle of attack is substantially minimized, wherein the at least one load sensor and the wind turbine blade are constructed of the same reinforcing fiber material.

26. The wind turbine blade assembly of claim 25, wherein the at least one active flow modification device is configured to introduce a jet flow with a large component of momentum and vorticity substantially along the wind flow proximate to the blade.

27. The wind turbine blade assembly of claim 25, wherein the at least one active flow modification device is configured to introduce a steady or an unsteady jet flow with a large component of momentum substantially disruptive to the wind flow proximate to the blade.

28. The wind turbine blade assembly of claim 25, wherein the at least one local load sensor is selected from a fiber optic sensor, a steady pressure sensor, an unsteady pressure sensor, an angle of attack sensor, an accelerometer, a strain gauge, and a fiber Bragg grating.

* * * * *